(12) United States Patent
Ramalingam et al.

(10) Patent No.: US 9,460,513 B1
(45) Date of Patent: Oct. 4, 2016

(54) METHOD FOR RECONSTRUCTING A 3D SCENE AS A 3D MODEL USING IMAGES ACQUIRED BY 3D SENSORS AND OMNIDIRECTIONAL CAMERAS

(71) Applicant: Mitsubishi Electric Research Laboratories, Inc., Cambrige, MA (US)

(72) Inventors: Srikumar Ramalingam, Cambridge, MA (US); Yuichi Taguchi, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/741,532

(22) Filed: Jun. 17, 2015

(51) Int. Cl.
  *G06K 9/00* (2006.01)
  *G06T 7/00* (2006.01)

(52) U.S. Cl.
  CPC ............ *G06T 7/0044* (2013.01); *G06T 7/003* (2013.01); *G06T 2207/10024* (2013.01); *G06T 2207/10028* (2013.01); *G06T 2207/10048* (2013.01)

(58) Field of Classification Search
  CPC ............ G06K 9/00201; G06K 9/4604; G06T 17/00; G06T 7/0059; G06T 7/0085
  USPC ........................................................ 382/154
  See application file for complete search history.

(56) References Cited

U.S. PATENT DOCUMENTS

| | | | |
|---|---|---|---|
| 9,102,055 B1* | 8/2015 | Konolige | B25J 9/163 |
| 2010/0172567 A1* | 7/2010 | Prokoski | A61B 5/0064 |
| | | | 382/132 |
| 2013/0321589 A1 | 12/2013 | Kirk et al. | |

OTHER PUBLICATIONS

Noah Snavely, Steve Seitz and Richard Szeliski, Photo Tourism, SIGGRAPH 2006.
Izadi et al., KinectFusion: Real-time 3D Reconstruction and Interaction Using a Moving Depth Camera, ACM Symposium on User Interface Software and Technology, Oct. 2011.

* cited by examiner

*Primary Examiner* — Manuchehr Rahmjoo
(74) *Attorney, Agent, or Firm* — Gene Vinokur; James McAleenan; Hironori Tsukamoto

(57) ABSTRACT

A method reconstructs a three-dimensional (3D) scene as a three-dimensional (3D) model by first acquiring red, green, blue, and depth (RGBD) images with a sensor, and wide field-of-view (FOV) red, green, and blue (RGB) images with a camera from different viewpoints. Pair-wise point matches among the RGBD images and the RGB images are identified, and a graph of nodes and edges is constructed using the pair-wise point matches. Initial poses of the RGBD images and the RGB images are estimated using pose constraints associated with the edges, and an initial 3D model of the scene is estimated using the estimated poses. Then, erroneous edges are removed in the graph, and bundle adjustment is applied to the initial poses and the initial 3D model to obtain refined poses and the 3D model of the scene.

14 Claims, 4 Drawing Sheets

METHOD FOR RECONSTRUCTING A 3D SCENE AS A 3D MODEL USING IMAGES ACQUIRED BY 3D SENSORS AND OMNIDIRECTIONAL CAMERAS

RELATED APPLICATION

This U.S. Patent Application is related to U.S. patent application Ser. No. 14/330,357, "Method for Calibrating Cameras with Non-Overlapping Views," filed by Taguchi et al. on Jul. 14, 2014, incorporated herein by reference. In that application, a method reconstructs a 3D scene as a 3D model using images acquired by a 3D sensor and registers the images from a 2D camera. In this patent, the method reconstructs the 3D model using both a 3D sensor and a 2D omnidirectional camera.

FIELD OF THE INVENTION

This invention relates generally to computer vision and image processing, and more particularly to reconstructing 3D scenes from images acquired by 3D sensors and omnidirectional cameras.

BACKGROUND OF THE INVENTION

There are many 3D reconstruction methods that use red, green, and blue (RGB) images and conventional structure-from-motion procedures to reconstruct 3D scenes. Generally, RGB image-based 3D reconstruction techniques have difficulties dealing with textureless regions, e.g., walls and ceilings. For reconstructing textureless regions, active sensors can be used. For example, the Kinect™ sensor for the Microsoft Xbox™ uses an infrared (IR) pattern for acquiring 3D data as a depth map (point cloud). The Kinect™ sensor is also equipped with a 2D camera to capture an RGB image. The depth map can be registered to the RGB image to generate a red, green, blue, and depth (RGBD) image.

In general, 3D sensors like Kinect™ can be used to reconstruct large scenes, see e.g., Izadi et al., "KinectFusion: Real-time 3D Reconstruction and Interaction Using a Moving Depth Camera," ACM Symposium on User Interface Software and Technology, October 2011.

However, the field of view (FOV) of such sensors can sometimes lead to several challenges, especially for scenes with corners and turns, where there may not be enough feature correspondences to obtain a good registration.

Some methods use already reconstructed RGB image-based models to estimate the pose of RGB cameras as in Snavely et al., "Photo Tourism: Exploring Photo Collections in 3D," ACM Transactions on Graphics, 2006.

SUMMARY OF THE INVENTION

The embodiments of the invention provide a method for reconstructing a scene as a 3D model using images acquired by a 3D sensor and an omnidirectional camera. The 3D sensor can be a Kinect™ sensor, and the omnidirectional camera can be a wide field of view (FOV) camera. RGB images are acquired by the camera, and RGBD images are acquired by the 3D sensor. Both types of images are used jointly to construct the 3D model of the scene.

The invention is based on the realization that better reconstructions are possible when different sensor modalities are used for the 3D reconstruction, and in particular, to solving a registration of RGBD images using wide FOV RGB images. For example, if it is difficult to match two RGBD images A and B, then one can obtain the registration using an intermediate wide FOV RGB image C. This way, one can obtain matches between A and C, and between B and C respectively, and then using C, to obtain the registration between the images A and B.

Another realization is based on using secondary feature in a pose graph to model the relationship between different pairs of images. The pose estimation and registration determine the pose of each of the images and then use constraints to identify incorrect relationships. Such incorrect relationships between images are identified before doing a bundle adjustment to obtain a complete 3D model of the scene.

DETAILED DESCRIPTION OF THE PREFERRED EMBODIMENTS

Figure 1:
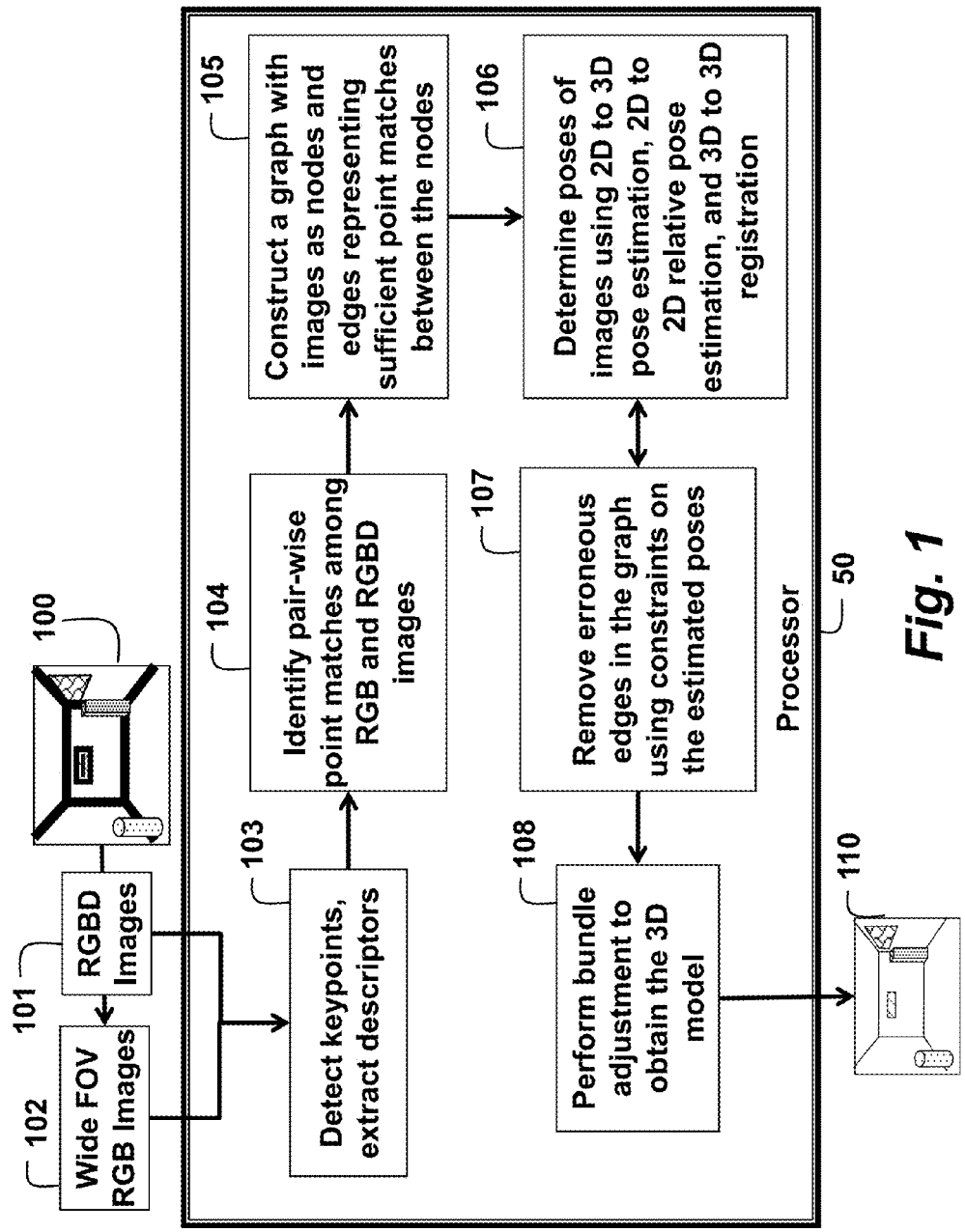
FIG. 1 is a flow diagram of a method for reconstructing a scene as a 3D model using images acquired by a 3D sensor and an omnidirectional camera.

FIG. 1 shows a method according to embodiments of our invention for reconstructing a scene 100 as a three-dimensional (3D) model using images acquired by a 3D sensor and an omnidirectional camera. We use a 3D sensor, such as Kinect™, to acquire narrow field of view (FOV) red, green, blue, and depth (RGBD) images 101 of the scene 100. The omnidirectional camera acquires wide FOV RGB images 102 of the scene 100.

We use a conventional feature detector, e.g., Speeded Up Robust Features (SURF), to detect 103 keypoints from all the images, and to extract descriptors from each image.

Then, we perform image-to-image feature matching to identify 104 pairs of images that have sufficient number of point matches. The image matching can also be done using methods, such as a vector of aggregated local descriptors (VLAD).

Next, we construct 105 a graph where nodes represent the images and edges represent pose constraints between the images. We determine 106 poses of the images using 2D to 3D pose estimation, 2D to 2D relative pose estimation, and 3D to 3D registration. We remove 107 erroneous edges in the graph using constraints on the poses as denoted by the edges in the graph. Then, we perform 108 bundle adjustment to obtain the 3D model 110.

The steps of the method can be performed in a processor 50 connected memory and input/output interfaces by buses as known in the art. Essentially, the invention transforms images of a scene into a 3D model of the scene.

Figure 2:
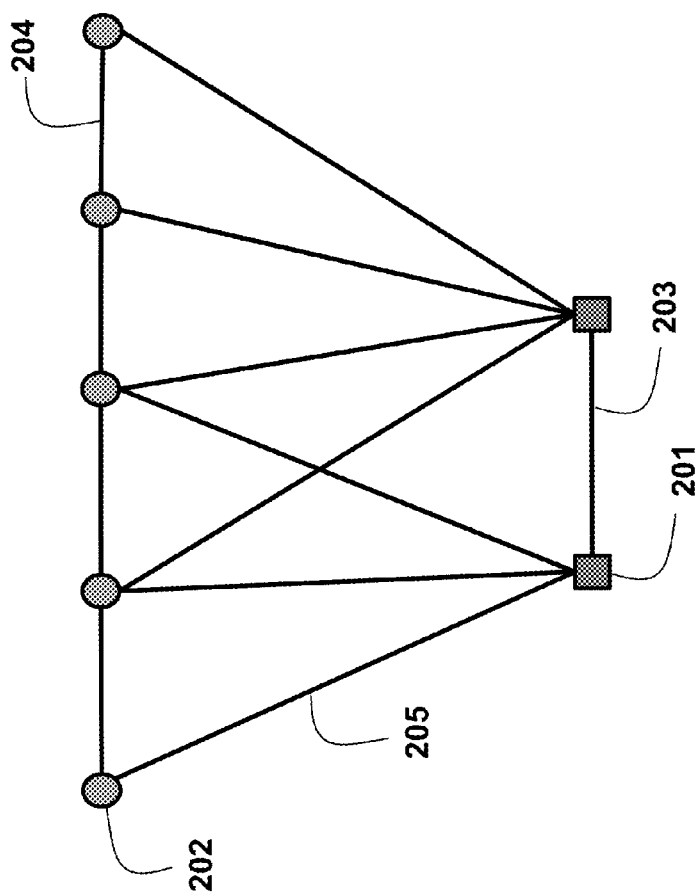
FIG. 2 is a schematic of the graph where nodes are images and edges denote pose constraints between the images based on image matching according to embodiments of the invention.

FIG. 2 shows the graph that denotes the matching between pairs of images. The images are denoted by nodes (circles or squares) and each edge denotes the pose constraints between the images. We use wide FOV RGB images 201 and narrow FOV RGBD images 202, as described above. We obtain image matching between two images in three different scenarios, e.g.:

1. The two images connected by an edge 203 are both wide FOV RGB images.
2. The two images connected by an edge 204 are both narrow FOV RGBD images.
3. One of the images is a wide FOV RGB image and the other image is a narrow FOV RGBD image connected by an edge 205.

We consider two images to be matched only when the two images share a minimum number of keypoint matches. When the two images share a sufficient number of point correspondences, then there exists pose constraints between the two images denoted by the edge connecting the two images.

As shown in FIG. 2, each wide FOV RGBD image is matched with several narrow FOV RGB images. This enables the wide FOV RGB image to act as a bridge in registering many narrow FOV RGB images.

Figure 3:
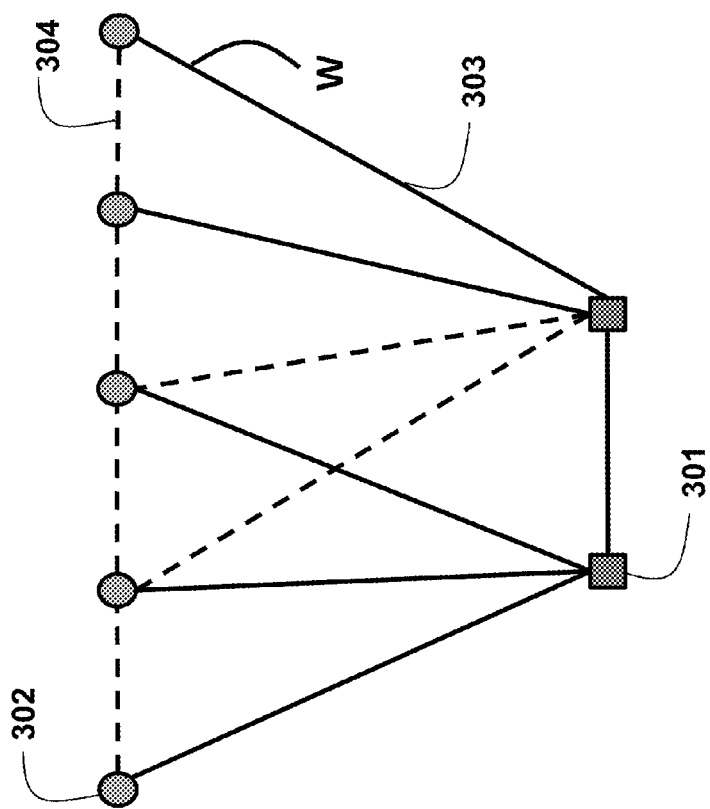
FIG. 3 is a schematic of the minimal spanning tree of the graph where images are nodes and edges are the pose constraints to remove erroneous edges according to embodiments of the invention.

FIG. 3 shows the use of constraints to remove erroneous edges in the graph based on the estimated poses. In order to do this, we use the following strategy. We consider the graph shown in FIG. 3. Squares denote the wide FOV RGB images 301 and circles denote the narrow FOV RGBD images 302. For each edge in the graph in FIG. 3, we assign a weight that is equal to a negation of the number of keypoint matches from the two image nodes that are incident on the edge. Based on these edge weights, we determine a minimal spanning tree.

We show the edges in the minimal spanning tree by solid lines 303, and remaining edges by dashed lines 304. We determine the initial poses of all images using the edges (denoting pose constraints) from the minimal spanning tree. Depending on the nature of the images incident on every edge, we use a different pose estimation procedure. For example, we can use a 3-point 3D to 3D registration procedure to determine the relative pose between two RGBD images. Given a matching between two RGB images, we can use a 5-point 2D to 2D relative pose estimation procedure to determine the relative pose. The relative pose between RGB and RGBD images can be obtained using a 2D to 3D pose estimation procedure. This 2D to 3D pose estimation between an RGBD model and an RGB image is also described in U.S. patent application Ser. No. 14/330,357 filed by Taguchi et al.

We arbitrarily assign an RGBD image or an RGB image as a root node in the minimal spanning tree. Without loss of generality, let the RGB image 301 be the root. We fix the coordinate frame of the root node as a world coordinate frame. Using breadth first traversal from the root node, we determine the pose of each image based on the edges. While traversing each edge, the pose of an image in one node is already known and the pose of the other node is estimated by using the relative pose assigned to the edge. After we obtain the poses of all the images, we use the pose constraints provided by the spanning tree edges to perform a bundle adjustment that produces the 3D model 110. The bundle adjustment simultaneously refines 3D coordinates describing the scene as well as parameters of the poses of the images to obtain refined poses of the images.

We incrementally add the non-spanning tree edges to provide loop-closure constraints and perform subsequent bundle adjustments to refine the 3D model. During the incremental addition, if an edge produces a camera pose that is far, based on a chosen distance metric in pose space, from the already refined pose, then we treat this edge as an erroneous edge and do not use this edge in the bundle adjustment.

Figure 4:
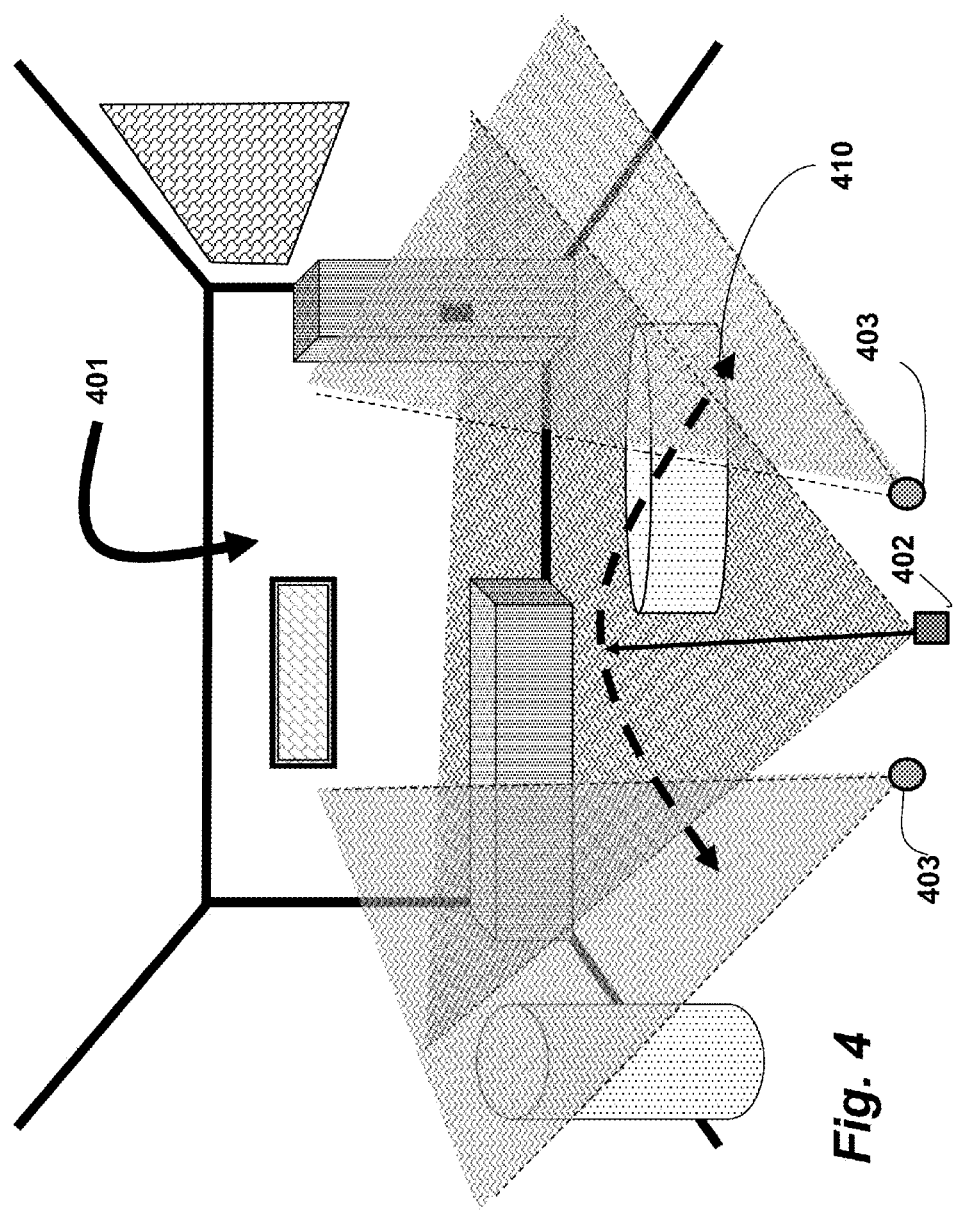
FIG. 4 is a schematic of the 3D reconstruction using narrow field of view (FOV) RGBD images and wide FOV RGB images according to embodiments of the invention.

FIG. 4 shows an example of the 3D reconstruction of an indoor scene 401 using a wide FOV RGB image 402 and two narrow FOV RGBD images 403. The RGB image 402 is used to register 410 the two RGBD images 403.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for reconstructing a three-dimensional (3D) scene as a three-dimensional (3D) model, comprising steps:
    acquiring, of the scene, red, green, blue, and depth (RGBD) images with a sensor, and wide field-of-view (FOV) red, green, and blue (RGB) images with a camera from different viewpoints;
    identifying pair-wise point matches among the RGBD images and the RGB images;
    constructing a graph of nodes and edges using the pair-wise point matches, wherein the nodes represent the RGBD images and the RGB images, and the edges represent pose constraints between the RGBD images and the RGB images;
    estimating initial poses of the RGBD images and the RGB images using the pose constraints;
    estimating an initial 3D model of the scene using the estimated poses;
    removing erroneous edges in the graph;
    applying bundle adjustment to the initial poses and the initial 3D model to obtain refined poses and the 3D model of the scene, wherein the steps are performed in a processor.

2. The method of claim 1, further comprising: identifying matches between two images, wherein each image can be an RGBD or an RGB image.

3. The method of claim 1, wherein the pair-wise point matches are determined using Speeded Up Robust Features (SURF).

4. The method of claim 1, wherein the identifying uses a vector of aggregated local descriptors (VLAD).

5. The method of claim 1, wherein 3-point 3D to 3D registration is used to determine the initial pose between two RGBD images.

6. The method of claim 1, wherein 3-point 2D to 3D pose estimation is used to determine the initial pose between at least one RGB image and at least one RGBD image.

7. The method of claim 1, wherein 5-point 2D to 2D relative pose estimation is used to determine the initial pose between two RGB images.

8. The method of claim 1, further comprising:
    assigning a weight to each edge; and
    estimating the initial poses of the images represented in the graph as nodes using the pose constraints and a minimal spanning tree based on the weights.

9. The method of claim 8, wherein the weights are based on a number of the pair-wise point matches between images represented by the nodes connected by one edge.

10. The method of claim 1, wherein the erroneous edges are removed based on an inconsistency between poses estimated using different edges.

11. The method of claim 1, wherein the sensor is an infrared (IR) sensor.

12. The method of claim 1, wherein at least one RGB image overlaps with at least two RGBD images.

13. The method of claim 1, wherein each edge represents a sufficient number of pair-wise point matches between the images.

14. The method of claim 1, wherein the pose that is far from the refined pose based on a distance metric is one of the erroneous edges.

\* \* \* \* \*